(12) United States Patent
Williams

(10) Patent No.: US 7,722,303 B2
(45) Date of Patent: May 25, 2010

(54) FRANGIBLE BLIND RIVET

(75) Inventor: Michael K Williams, Terryville, CT (US)

(73) Assignee: Newfrey LLC, Newark, DE (US)

( * ) Notice: Subject to any disclaimer, the term of this patent is extended or adjusted under 35 U.S.C. 154(b) by 526 days.

(21) Appl. No.: 11/335,769

(22) Filed: Jan. 19, 2006

(65) Prior Publication Data
US 2006/0182512 A1    Aug. 17, 2006

Related U.S. Application Data

(60) Provisional application No. 60/652,027, filed on Feb. 11, 2005.

(51) Int. Cl.
*F16B 13/04* (2006.01)
*F16B 19/04* (2006.01)

(52) U.S. Cl. ............................. 411/41; 411/34; 411/500

(58) Field of Classification Search .................. 411/34, 411/41–43, 500–501
See application file for complete search history.

(56) References Cited

U.S. PATENT DOCUMENTS

| | | | |
|---|---|---|---|
| 2,612,073 A * | 9/1952 | Taylor ........................ 411/501 |
| 3,682,508 A | 8/1972 | Briles |
| 3,842,710 A | 10/1974 | Poupitch |
| 3,964,364 A | 6/1976 | Poe |
| 4,169,004 A | 9/1979 | Kock et al. |
| 4,216,697 A | 8/1980 | Wilson |
| 4,263,833 A | 4/1981 | Loudin et al. |
| 4,293,258 A * | 10/1981 | McKewan ..................... 411/30 |
| 4,376,604 A * | 3/1983 | Pratt et al. .................... 411/34 |
| 4,436,467 A * | 3/1984 | Larsson et al. ................ 411/34 |
| 4,541,761 A * | 9/1985 | Bryce, Jr. ...................... 411/34 |
| 4,585,382 A * | 4/1986 | Bryce, Jr. ...................... 411/34 |
| 5,062,546 A | 11/1991 | Mackal |
| 5,248,231 A * | 9/1993 | Denham et al. ............... 411/43 |
| 5,346,347 A | 9/1994 | Barikosky et al. |
| 5,496,140 A * | 3/1996 | Gossmann et al. ............ 411/43 |
| 5,551,816 A * | 9/1996 | Brewer et al. ................. 411/43 |
| 6,171,038 B1 | 1/2001 | Pratt et al. |
| 6,254,324 B1 | 7/2001 | Smith et al. |

(Continued)

FOREIGN PATENT DOCUMENTS

GB    2 332 722 A    12/1997

(Continued)

*Primary Examiner*—Victor Batson
*Assistant Examiner*—David Reese
(74) *Attorney, Agent, or Firm*—Harness, Dickey & Pierce, P.L.C.

(57) ABSTRACT

A blind rivet is provided that is operable for insertion into a workpiece. The blind rivet can include a body portion having a first end and second end. The body portion can include a radial flange formed at the first end and can define a bore extending through the body portion. The rivet can include a mandrel with a mandrel head operable to engage the second end of the body portion. The mandrel head can be larger than the bore and can be coupled to a stem. The stem can be configured to pass through the bore and the flange to enable the body portion to engage the workpiece. The radial flange can also include a plurality of bearing surfaces adapted to be coupled to at least one tool for receipt of a predetermined torsional load at the radial flange to cause failure of the body portion.

13 Claims, 2 Drawing Sheets

U.S. PATENT DOCUMENTS

| | | |
|---|---|---|
| D460,911 S | 7/2002 | Sato et al. |
| 6,702,232 B2 | 3/2004 | Dovey et al. |
| 6,746,191 B2 | 6/2004 | Edland |
| 6,905,296 B2 * | 6/2005 | Millington .................... 411/48 |
| 7,182,561 B2 * | 2/2007 | Jones ......................... 411/43 |
| 2002/0119024 A1 | 8/2002 | Jennings et al. |
| 2004/0022597 A1 | 2/2004 | Jones et al. |
| 2004/0071522 A1 | 4/2004 | Millington |
| 2004/0071525 A1 | 4/2004 | Millington |

FOREIGN PATENT DOCUMENTS

| | | |
|---|---|---|
| JP | 2000 084755 | 3/2000 |

* cited by examiner

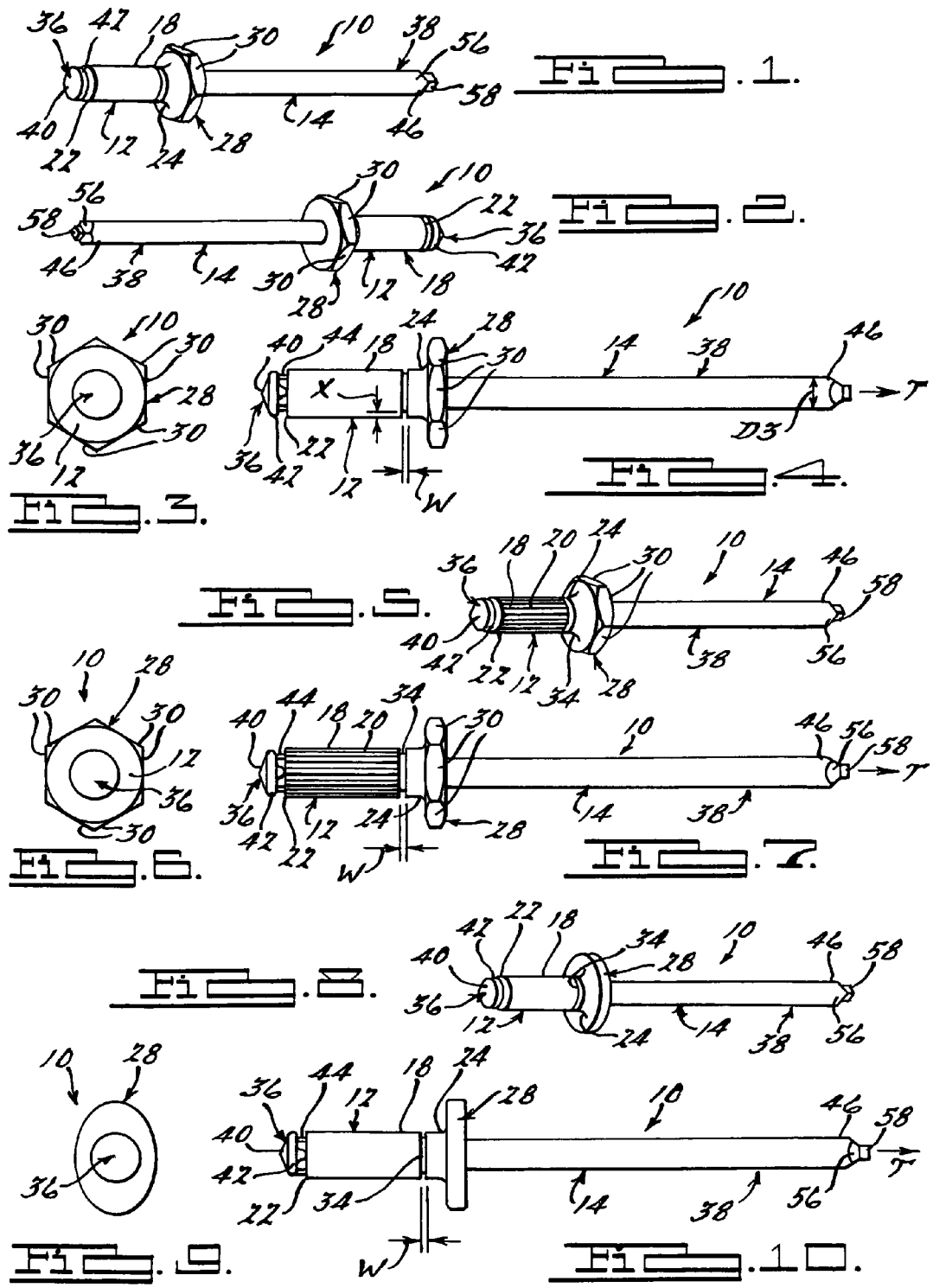

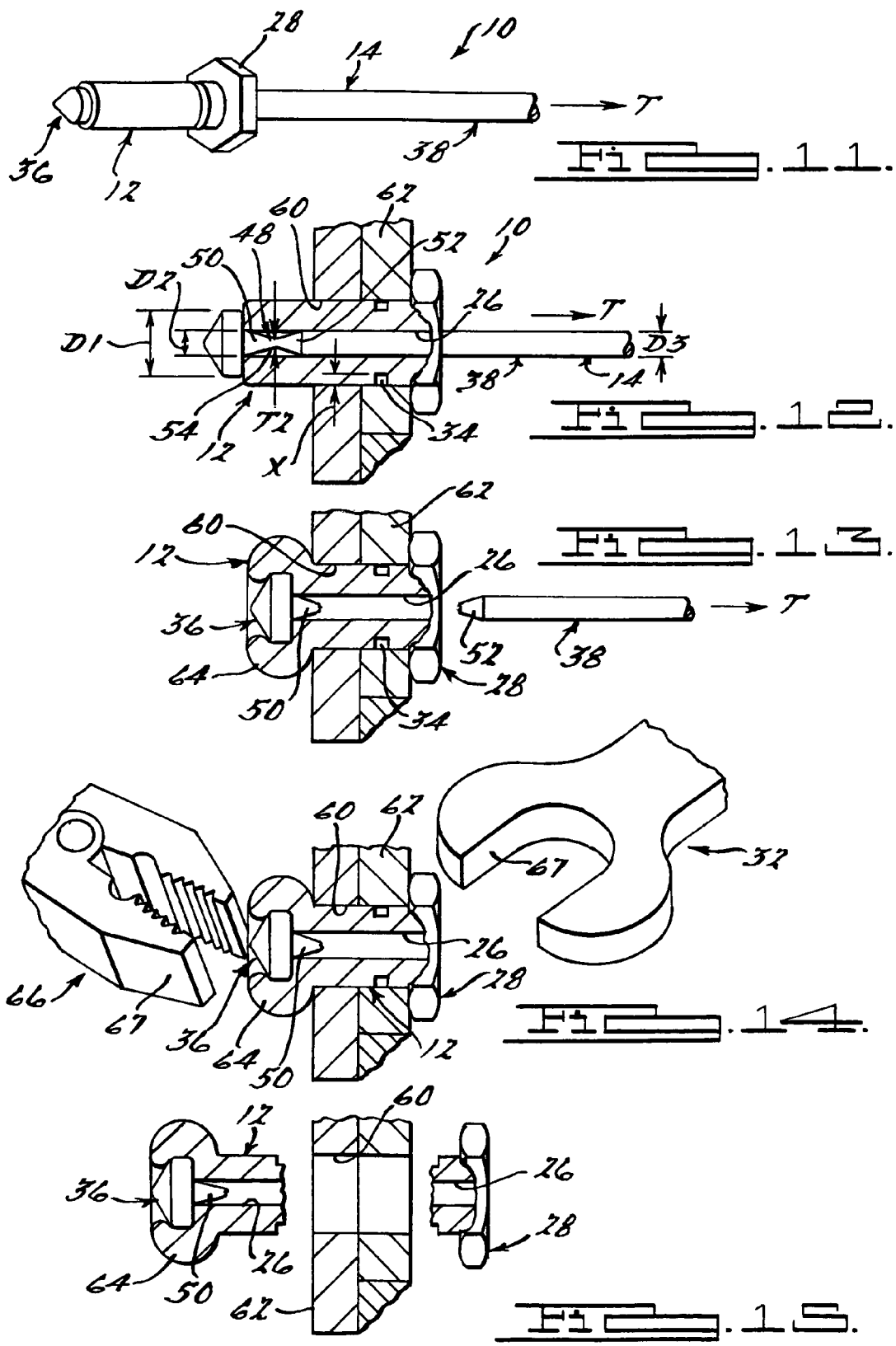

FRANGIBLE BLIND RIVET

CROSS-REFERENCE TO RELATED APPLICATIONS

This application claims the benefit of U.S. Provisional Application No. 60/652,027, filed on Feb. 11, 2005. The disclosure of the above application is incorporated herein by reference.

FIELD

The present disclosure relates to fastening system and more particularly to a frangible blind rivet.

BACKGROUND

The statements in this section merely provide background information related to the present disclosure and may not constitute prior art.

Generally blind rivets include a mandrel and a tubular shell. The mandrel typically has a pulling stem with a radially enlarged head attached at one end. An axial bore may be formed through the length of the shank and the flange. Part of the pulling stem of the mandrel may be located within the bore, with the enlarged head abutting against the end of the shank remote from the flange. The rest of the pulling stem can extend beyond the flange away from the tubular shell. The tubular shell can generally have a cylindrical shaped shank with a radial flange formed at one end of the shank for engaging a face of the workpiece. A portion of the shell can be of a reduced cross-section or form a breakneck on the part of the stem that is located within the shank.

Typically, in order to set the blind rivet, the flange can be held stationary whilst the exposed part of the pulling stem is pulled axially away from the flange so that the enlarged head is forced to pass through the bore. Because the diameter of the enlarged head is substantially larger than the bore, it can cause the shank to plastically deform to form an annular bulge or fold, which can project radially outwardly from the shank. Thus the radially outward bulge forms the blind head and can secure the opposite side of the workpiece to that of the flange. Once the pulling force on the stem exceeds a predetermined amount, the breakneck can break to leave the rivet set. The rest of the stem can then be removed and discarded.

In many situations, the rivet may need to be removed from the workpiece in order to repair or replace the workpiece. Typically, in order to remove the blind rivet from the workpiece, the breakneck section is drilled out using a suitable piece of equipment and then the rivet may be tapped out of the workpiece, using such equipment as a mallet. However, in situations where the rivet may not be easily accessible with a drill or a mallet, the workpiece may have to be damaged in order to access the rivet to remove it, or the workpiece may have to be scrapped. Accordingly, it is desirable to provide a blind rivet that can be more easily removed from a workpiece.

SUMMARY

The present invention provides a blind rivet that is operable for insertion into a workpiece. The blind rivet includes a body portion including a radial flange formed at a first end and a bore extending through the body portion. The rivet includes a mandrel including a mandrel head operable to engage a second end of the body portion. The mandrel head is larger than the bore and is coupled to a stem. The stem is operable to pass through the bore and the flange to cause the mandrel head to deform onto the workpiece. The radial flange also includes a plurality of bearing surfaces operable to engage at least one tool in order to remove the rivet from the workpiece.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 1 is a perspective side view of a blind rivet according to the principles of the present invention;

FIG. 2 is a second perspective side view of the blind rivet of FIG. 1;

FIG. 3 is a top view of the rivet of FIG. 1;

FIG. 4 is a side view of the rivet of FIG. 1;

FIG. 5 is a perspective side view of a blind rivet according to a second embodiment of the present invention;

FIG. 6 is a top view of the rivet of FIG. 5;

FIG. 7 is a side view of the rivet of FIG. 5;

FIG. 8 is a perspective side view of a blind rivet according to a third embodiment of the present invention;

FIG. 9 is a top view of the rivet of FIG. 8;

FIG. 10 is a side view of the rivet of FIG. 8;

FIG. 11 is an environmental view of the rivet of FIG. 1 prior to insertion into the workpiece;

FIG. 12 is an environmental view of the rivet of FIG. 1 in a first position prior to deformation;

FIG. 13 is an environmental view of the rivet of FIG. 1 in a second position after deformation of the rivet into a locked position;

FIG. 14 is an environmental view of the rivet of FIG. 1 in preparation to be removed from a workpiece; and FIG. 15 is an environmental view of the rivet of FIG. 1 upon removal of the rivet from the workpiece.

DETAILED DESCRIPTION

The following description is merely exemplary in nature and is not intended to limit the present disclosure, application, or uses. It should be understood that throughout the drawings, corresponding reference numerals indicate like or corresponding parts and features. Although the following description details the configuration of a rivet that is capable of removal from a workpiece by a wrench, it will be understood that various other instruments could be employed to remove the rivet, and the rivet may contain the appropriate features to engage these instruments.

With reference now to FIGS. 1 through 12, a rivet 10 is shown. The rivet 10 can include a body 12 and a mandrel 14. The body 12 can be generally cylindrical and can be comprised of any material that is capable of plastically deforming in tension and failing in shear, such as aluminum or steel. The body 12 can have a generally uniform exterior 18; however, the exterior 18 can include a plurality of serrations 20, as shown in FIGS. 5, 6 and 7, to enable the body 12 to further engage a workpiece (not specifically shown).

The body 12 can further include a first end 22, a second end 24 and a central bore 26 (FIG. 13). The first end 22 can be operable to interface with the mandrel 14 and plastically deform to secure a workpiece, as will be discussed in greater detail herein. The second end 24 of the body 12 can include a radial flange 28 (FIGS. 1, 5 and 8), which can generally be formed onto the second end 24; however, any suitable post processing step could be used to couple the radial flange 28 to the second end 24 of the body 12, such as welding or adhesives. The radial flange 28 may comprise a plurality of flat portions 30 to form a generally hexagonal head, or in the alternative, as shown in FIGS. 8, 9 and 10, the radial flange 28 may be oval in shape. The shape of the radial flange 28 can generally be such that a first tool 32 (shown in FIG. 17) can engage the radial flange 28. The first tool 32 can be any suitable tool including a jaw 67 capable of grasping the radial flange 28, such as a wrench, channel locks, socket wrench or the like. Thus, the radial flange 28 may be of any shape operable to engage the jaw 67 of the first tool 32, as will be discussed in greater detail herein.

The second end 24 of the body 12 can further include an annular groove 34. The annular groove 34 can generally be formed on the exterior 18 of the body 12, typically adjacent to the radial flange 28; however, the annular groove 34 can generally be formed at any desired position on the body 12 (for example, the annular groove 34 could be formed at any location 25% to 75% along the body 12 from the first end 22). Although the groove 34 is described herein as being annular, it will be understood that the actual shape of the groove 34 could be any shape that corresponds with the shape of the body 12. In addition, it will be understood that the annular groove 34 may be located at any desired position on the body 12, and can alternatively be formed on an interior surface of the body 12 (not shown). The annular groove 34 can have a rectangular cross-section as shown in FIGS. 12 and 13, but any other cross-section, such as pointed or rounded, could be employed. The annular groove 34 has a width W and a depth X (as best shown in FIG. 12) configured to enable the radial flange 28 to separate from the second end 24 of the body 12 during the application of a torsional force, as will be described in greater detail herein. Further, it will be understand that although only one annular groove 34 is illustrated herein, multiple annular grooves 34 could be employed. The central bore 26 can extend from the first end 22 to the second end 24 of the body 12 and can be operable to receive the mandrel 14, as best shown in FIG. 12.

The mandrel 14 can include a mandrel head 36 coupled to a stem 38, as best shown in FIG. 12. With continuing reference to FIG. 12 and additional reference to FIGS. 1 through 14, the mandrel head 36 can generally include a conical portion 40 coupled to a cylindrical base 42. The cylindrical base 42 can have a diameter D1, which can generally be greater than a diameter D2 of the central bore 26 such that the mandrel head 36 can be unable to pass through the central bore 26. It will be understood, however, that any appropriate shape could be employed for the mandrel head 36, as long as the diameter D1 of the mandrel head 36 is greater than the diameter D2 of the central bore 26. The mandrel head 36 can typically be formed onto the stem 38.

The stem 38 can include a first end 44 coupled to the mandrel head 36 and a second end 46. The stem 38 can be generally cylindrical with a diameter D3, which can be at least slightly less than the diameter D2 of the central bore 26; however, any suitable shape and diameter could be employed. The first end 44 of the stem 38 can include a breakneck section 48, which can be operable to enable the stem 38 to separate from the mandrel head 36. The breakneck section 48 can generally include a first tapered portion 50, which can meet a second tapered portion 52 at a point 54. The thickness T2 of the point 54 is such that the first end 44 of the stem 38 can be severed from the second end 46 of the stem 38 upon the application of a pre-determined tensile force, as will be discussed in greater detail herein.

The second end 46 of the stem 38 can include a tapered section 56, which can terminate in a generally square portion 58. The portion 58 is shown as having a generally square cross-section; however, the portion 58 may be sized in any appropriate shape to interface with a pulling tool (not shown). The pulling tool can be operable to apply a tensile force T to the stem 38 of the mandrel 14 via the portion 58 to set the rivet 10.

With additional reference to FIGS. 12, 13, 14 and 15, in order to set the rivet, the body 12 can be first slid onto the mandrel 14, such that the mandrel head 36 can abut the first end 22 of the body 12. Next, the assembled rivet 10 can be placed into a hole 60 formed in a workpiece 62 (FIG. 12). Then, the pulling tool (not shown) may be coupled to the portion 58 of the stem 38 of the mandrel 14, to begin the application of the tensile force T to the mandrel 14. The application of the tensile force T can cause the mandrel head 36 to apply a compression force to the first end 22 of the body 12. The compressive loading of the first end 22 of the body 12 can cause the first end of the body to 12 expand outward. In particular, as the diameter D1 of the mandrel head 36 is greater than the diameter D2 of the central bore 26, the size of the mandrel head 36 coupled with the tensile force T can cause the first end 22 of the body 12 to plastically deform into an annular bulge 64 as shown in FIG. 13.

Once the first end 22 of the body 12 has plastically deformed to a pre-determined amount, the continued application of the tensile force T can cause the breakneck portion 48 to fracture, severing the second end 46 of the stem 38 from the first end 44 of the stem 38. After the second end 46 of the stem 38 has detached from the breakneck portion 48, the rivet 10 can be firmly secured to the workpiece 62.

With additional reference to FIG. 14, in order to remove the rivet 10 from the workpiece 62, a second tool 66 can be coupled to the first end 22 of the body 12, around the annular bulge 64. The second tool 66 can be any suitable tool including a jaw 67 that is capable of grasping the annular bulge 64, such as a wrench, channel locks, socket wrench or the like. Next, the first tool 32 can be coupled to the second end 24 of the body 12, around the radial flange 28. Then, the first tool 32 can be rotated while the second tool 66 is held fast, to create a torsional load that is transmitted along the radial flange 28. However, it should be noted that when the tubular body includes the plurality of serrations 20 as illustrated in FIG. 5, it may not be necessary to use the second tool 66 as the serrations 20 can serve to firmly hold the body 12 within the workpiece 62.

Once the torsional load reaches a pre-determined amount, the body 12 of the rivet 10 will fail at the annular groove 34, as shown in FIG. 15. In particular, the torsional force from the first tool 32 will cause the body 12 of the rivet 10 to fail in shear. After the radial flange 28 is separated from the rivet 10, the remaining body 12 of the rivet 10 can then be pulled out of the workpiece 62 by the first tool 32 or tapped out of the workpiece 62 using a mallet and chisel, for example (not shown).

What is claimed is:

1. A blind rivet operable for insertion into a workpiece having first and second exterior surfaces comprising:
   a body portion defining a through axis having a first end and a second end, the body portion including a radial flange formed at the first end and defining a bore extending through the body portion, said body further defining an annular groove on an exterior surface of the body portion, said groove spaced a predetermined distance apart from the radial flange and fully disposed in its entirety between the first and second exterior surfaces of the workpiece when the body portion is seated in the workpiece; and a mandrel including a mandrel head operable to engage the second end of the body portion, the mandrel head larger than the bore and coupled to a stem, the stem configured to pass through the bore and the flange to enable the body portion to engage the workpiece, wherein the radial flange includes a plurality of flat bearing surfaces generally parallel to the through axis adapted to be coupled to at least one tool for receipt of a predetermined torsional load at the radial flange, the load being applied generally perpendicular to the through axis, to cause annular failure of the body portion at the annular groove and separation of the body portion into two pieces at the annular groove.

2. The blind rivet of claim 1, wherein the stem further comprises a breakneck portion disposed adjacent to the mandrel head, the breakneck portion operable to fracture upon receipt of a pre-determined load.

3. The blind rivet of claim 1, wherein the annular groove is responsive to the torsional force from the tool to enable the annular fracture at the annular groove.

4. The blind rivet of claim 3, wherein the body portion is adapted to be punched out of the workpiece after the radial flange is separated from the body portion.

5. The blind rivet of claim 3, wherein the mandrel head is adapted to receive a torsional force from a second tool.

6. The blind rivet of claim 1, wherein the radial flange is adapted to engage a jaw of the tool.

7. The blind rivet of claim 1, wherein the bearing surfaces on the radial flange form a hexagonal head.

8. A blind rivet for insertion into a workpiece having first and second exterior surfaces comprising:

a cylindrical body having a first end, a second end and defining a through axis and a bore extending through the body, the body including a radial flange formed at the first end and an annular groove formed on the body, said annular groove is spaced a predetermined distance apart from the radial flange and disposed in its entirety between the first and second exterior surfaces of the workpiece when the body portion is seated in the workpiece; and a mandrel including a mandrel head operable to engage the second end of the body portion, the mandrel head larger than the bore and coupled to a stem, the stem operable to pass through the bore and the flange, the stem adapted to cause the body to engage the workpiece, wherein the radial flange has a pair of flat bearing surfaces configured to accept a torsional force applied to the flat bearing surfaces generally perpendicular to the through axis to cause the annular groove to fail in torsional shear when the radial flange is rotated with respect to the cylindrical body about the through axis such that the body portion separates into two pieces at the annular groove.

9. The blind rivet of claim 8, wherein the stem further comprises a breakneck portion disposed adjacent to the mandrel head, the breakneck portion operable to fracture upon receipt of a pre-determined load.

10. The blind rivet of claim 8, wherein the annular groove is responsive to the predetermined torsional force to enable the radial flange to separate from the body upon relative rotation of the radial flange with respect to the body.

11. The blind rivet of claim 8, wherein the radial flange comprises a plurality of flat bearing surfaces.

12. The blind rivet of claim 11, wherein the plurality of flat portions form a hexagonal shape.

13. The blind rivet of claim 8, wherein the body is configured to be punched out of the workpiece after the radial flange is separated from the body.

* * * * *